(12) United States Patent
Klimas, Jr. et al.

(10) Patent No.: US 11,306,838 B2
(45) Date of Patent: Apr. 19, 2022

(54) PILOT-OPERATED PRESSURE RELIEF VALVE NOZZLE

(71) Applicant: Dresser, LLC, Houston, TX (US)

(72) Inventors: Richard J. Klimas, Jr., Orange Park, FL (US); Rajesh Krithivasan, Jacksonville, FL (US); Orie Woodman Van Doran, St. Johns, FL (US); Vigneshwar Shaliwan Wali, Jacksonville, FL (US)

(73) Assignee: DRESSER, LLC, Houston, TX (US)

( * ) Notice: Subject to any disclaimer, the term of this patent is extended or adjusted under 35 U.S.C. 154(b) by 208 days.

(21) Appl. No.: 16/832,682

(22) Filed: Mar. 27, 2020

(65) Prior Publication Data

US 2021/0301935 A1 Sep. 30, 2021

(51) Int. Cl.
*F16K 17/10* (2006.01)

(52) U.S. Cl.
CPC .................................. *F16K 17/105* (2013.01)

(58) Field of Classification Search
CPC .................................................... F16K 17/105
See application file for complete search history.

(56) References Cited

U.S. PATENT DOCUMENTS

| | | | | |
|---|---|---|---|---|
| 570,727 A * | 11/1896 | Gale | ....................... | G05D 7/03 137/487 |
| 1,176,535 A * | 3/1916 | Fulton | .................. | F16K 31/385 251/45 |
| 2,273,111 A * | 2/1942 | Kindl | .................... | G05D 16/163 137/489.5 |
| 2,277,162 A * | 3/1942 | Soderberg | ............ | G05D 16/163 137/489.3 |
| 2,278,952 A * | 4/1942 | Soderberg | ............ | G05D 16/163 137/492.5 |
| 2,309,848 A * | 2/1943 | King | .................... | G05D 16/163 137/484.2 |
| 2,417,994 A * | 3/1947 | Sheets | ................... | F16K 31/385 251/24 |
| 2,576,516 A * | 11/1951 | Jurs | ....................... | F16K 17/105 137/491 |
| 2,611,218 A * | 9/1952 | Spence | ................ | G05D 16/163 137/485 |
| 2,624,980 A * | 1/1953 | Hughes | ................ | G05D 16/163 137/492.5 |
| 2,759,488 A * | 8/1956 | Garrett | ................... | F16K 17/105 137/491 |

(Continued)

*Primary Examiner* — Craig M Schneider
*Assistant Examiner* — Frederick D Soski
(74) *Attorney, Agent, or Firm* — Mintz Levin Cohn Ferris Glovsky and Popeo, PC; Lisa Adams

(57) ABSTRACT

A pilot-operated pressure relief valve nozzle assembly and associated systems and methods are provided. In an exemplary embodiment, the nozzle assembly includes a body having an elongate shaft with an inner lumen extending therein and a flange at one end of the elongate shaft and having an annular notch formed therein. The annular notch is configured to seat an annular ring, and the annular notch includes an annular groove formed therein that enables communication between a first bore extending through the flange from the inner lumen to the annular groove and a second bore extending through the annular ring, thus allow the first and second bores to be radially offset from one another.

20 Claims, 15 Drawing Sheets

(56) References Cited

U.S. PATENT DOCUMENTS

| | | | | | |
|---|---|---|---|---|---|
| 2,774,373 | A | * | 12/1956 | Fievet | F16K 17/105 137/490 |
| 2,796,885 | A | * | 6/1957 | Garrett | F16K 17/105 137/491 |
| 2,991,796 | A | * | 7/1961 | Griswold | F16K 31/365 137/489 |
| 3,211,174 | A | * | 10/1965 | Weise | F16K 17/105 137/469 |
| 3,282,556 | A | * | 11/1966 | Hancook | F16K 31/402 251/122 |
| 3,294,111 | A | * | 12/1966 | Abercrombie | F16K 17/105 137/492 |
| 3,414,008 | A | * | 12/1968 | Greenwood | F16K 17/105 137/492 |
| 3,568,706 | A | * | 3/1971 | Weise | G05D 16/024 137/112 |
| 4,058,287 | A | * | 11/1977 | Fromfield | F16K 31/402 251/46 |
| 4,186,766 | A | * | 2/1980 | Snyder | F16K 17/105 137/458 |
| 4,250,913 | A | * | 2/1981 | Scull | F16K 31/385 137/116.5 |
| 4,316,598 | A | * | 2/1982 | Maggio | F16K 17/105 251/63 |
| 4,355,657 | A | * | 10/1982 | Reip | F16K 17/02 137/102 |
| 4,390,041 | A | * | 6/1983 | Reip | F16K 17/105 137/102 |
| 4,609,008 | A | * | 9/1986 | Anderson, Jr. | G05D 16/163 137/102 |
| 4,715,578 | A | * | 12/1987 | Seltzer | F16K 7/17 251/25 |
| 4,800,918 | A | * | 1/1989 | Arens | E03C 1/104 137/488 |
| 4,848,397 | A | * | 7/1989 | Bickford | F16K 17/105 137/509 |
| 4,881,571 | A | * | 11/1989 | Reip | F16K 17/105 137/488 |
| 4,917,144 | A | * | 4/1990 | Giles | G05D 16/16 137/488 |
| 5,443,090 | A | * | 8/1995 | Ligh | F16K 17/105 137/489 |
| 5,669,405 | A | * | 9/1997 | Engelmann | A62C 35/68 137/107 |
| 5,842,501 | A | * | 12/1998 | Powell | F16K 31/383 137/489 |
| 5,899,434 | A | * | 5/1999 | Nishimura | F16K 31/402 251/30.02 |
| 5,992,449 | A | * | 11/1999 | Sprague | F16K 17/10 137/488 |
| 6,076,798 | A | * | 6/2000 | Deng | F16K 31/126 137/494 |
| 6,354,319 | B1 | * | 3/2002 | Mooney | G05D 16/163 137/14 |
| 8,136,545 | B2 | * | 3/2012 | Jablonski | G05D 16/163 137/492 |
| 8,967,175 | B2 | * | 3/2015 | Azoulay | F16K 37/0008 137/2 |
| 9,297,465 | B2 | * | 3/2016 | Mevius | F16K 17/32 |
| 9,760,097 | B2 | * | 9/2017 | Masias | G05D 16/163 |
| 10,202,987 | B2 | * | 2/2019 | Strobel | F16K 11/07 |
| 10,948,104 | B2 | * | 3/2021 | De Feo | F16K 31/126 |
| 2017/0227134 | A1 | * | 8/2017 | Tuineag | G05D 7/03 |
| 2020/0347956 | A1 | * | 11/2020 | Mears | G05D 16/163 |
| 2020/0347957 | A1 | * | 11/2020 | Mears | G05D 16/10 |
| 2021/0301935 | A1 | * | 9/2021 | Klimas, Jr. | F16K 17/105 |

* cited by examiner

1000

Receiving, at a pilot valve, a first inlet pressure of a fluid at an inlet of a main valve received from a sensing line coupling the pilot valve to a nozzle disposed in the inlet.   ~ 1010

PILOT-OPERATED PRESSURE RELIEF VALVE NOZZLE

BACKGROUND

Pressure relief valves are mechanical devices which are commonly used within power generation, refining, oil and gas production environments as overpressure protection devices to prevent the increase in pressure of pressurized fluids beyond the safe limits of the production environment. Pressure relief valves are also commonly coupled to pressurized storage vessels and pressurized fluid systems within these production environments. Pressure relief valves prevent such vessels and the pipelines connecting them from exceeding pressure thresholds, above which the vessels or pipelines may fail and thereby cause potentially catastrophic damage.

There are two primary forms of pressure relief valves: direct spring-operated and pilot-operated. A direct spring-operated pressure relief valve uses a spring to transmit the force required to keep the valve closed. Relief of pressurized fluid system pressure can occur when the force generated by system pressure overcomes the force generated by the spring in the valve. In contrast, a pilot-operated pressure relief valve uses the pressurized system pressure to generate the forces required to keep a main pressure relief valve closed. A pilot-operated pressure relief valve has a main valve and pilot valve which are in fluid communication. The main valve in the pilot operated pressure relief valve provides the overpressure protection by opening and relieving the system pressure and the pilot valve controls the opening and closing of the main valve in response to changes in the pressurized system pressure. Similar to the direct spring-operated pressure relief valve, the pressurized system pressure, which is in fluid communication with a pilot valve and the main valve, overcomes a spring force imparted by a spring within the pilot valve, which isolates the pressurized system pressure from the pressure providing the opposing force in the main pressure relief valve. Subsequently, the pressure stored to keep the main valve closed is relieved to a lower pressure system to allow the main pressure relief valve to open and begin relief of the pressurized system pressure.

For economic or functional reasons, a customer may choose to convert the type of pressure relief valve at a specific installation location, for example, by converting from a direct spring-operated pressure relief valve to a pilot-operated pressure relief valve. Due to the aforementioned operational differences between the two types of pressure relief valves, to successfully convert a direct spring-operated pressure relief valve to a pilot-operated pressure relief valve, the entire valve assembly can be swapped or, in the alternative, like components between both types of pressure relief valves can be salvaged and combined with parts unique to the pilot-operated valve type, such as the plumbing required to establish a fluid connection between the system pressure at the inlet of the main pressure relief valve and the pilot valve. Traditionally, this requires the usage of a sensing ring which is mounted between the mating pipe feeding the main valve and the raised face of the through-nozzle positioned in the main valve. This is not ideal for customers who wish to maintain their current piping configuration, as the sensing ring adds additional height to the valve and causes the valve to no longer mate with downstream piping. Alternatively, the customer may choose to transport system pressure upstream of the install location of the pilot-operated pressure relief valve, but may incur additional costs to do so.

Accordingly, a need exists for improved valve components that permit the replacement of a direct spring-operated pressure relief valve with a reduction in cost and pressurized fluid system retooling/replumbing.

SUMMARY

In general, a pilot-operated pressure relief valve nozzle and associated systems and methods are provided.

In one aspect, a pilot-operated pressure relief valve nozzle assembly is provided and can include a body having an elongate shaft extending along a longitudinal axis from a first end of the body to a second end of a body. The elongate shaft can include an inner lumen extending therethrough and a flange at the second end. In some embodiments, the inner lumen can extend between a first opening formed at the first end and a second opening formed at the second end. The flange can include an annular notch formed therein with an annular groove formed in the annular notch. In some embodiments, the annular notch can include a first surface and a second surface oriented orthogonal to the first surface. In such an embodiment, the first surface can extend parallel to the longitudinal axis, and the annular groove can be formed in the first surface. The flange can also include a first bore extending therethrough from the inner lumen to the annular groove. In some embodiments, the first bore can be configured to receive a sensing tube having a sense hole oriented perpendicular to a centerline axis of the sensing tube and oriented parallel to the longitudinal axis of the elongate shaft, and the sense hole can face the second opening. In such an embodiment, the sensing tube can extend into the inner lumen such that an inlet pressure can be sensed. The pilot-operated pressure relief valve nozzle assembly can further include an annular ring seated in the annular notch. In some embodiments, the annular ring can be independently oriented relative to the body. The annular ring can include an inner annular ring surface, an outer annular ring surface radially outward from the inner annular ring surface, and a second bore extending through the annular ring between the inner annular ring surface and the outer annular ring surface. In some embodiments, the annular groove can define a fluid pathway between the annular groove and the inner annular ring surface. The second bore can be in fluid communication with the first bore via the annular notch. In some embodiments, the second bore can be radially off-set from the first bore. In some embodiments, the second bore can include a port proximate the outer annular ring surface that can be configured to accommodate a first end connection of a pilot valve sensing line.

In another aspect, a system is provided and includes a pilot-operated pressure relief valve configured to regulate a system pressure of a pressurized fluid system. The pilot-operated pressure relief valve can include a main valve having an inlet in fluid communication with the pressurized fluid system, a pilot valve in fluid communication with the main valve, and a sensing line configured to measure an inlet pressure of the pressurized fluid system. The system can also include a pilot-operated pressure relief valve nozzle having a body with an elongate shaft disposed in the inlet and a flange disposed proximate the inlet. The elongate shaft can have an inner lumen extending therethrough and in fluid communication with the inlet of the main valve. The flange can have an annular notch that seats an annular ring, and the flange can have an annular groove formed in the annular notch such that a first bore extending through the flange from the inner lumen to the annular notch fluidly communicates with a second bore extending through the annular ring via the annular groove thus allowing fluid communication between the inner lumen and the sensing line. In some embodiments, the groove can be axially aligned with the first bore and the second bore. In other embodiments, the first bore can receive a sensing tube that extends into the inner lumen such that an inlet pressure is sensed. In yet other embodiments, the second bore can receive a sensing tube coupled to the sensing line. In some embodiments, the second bore can include a port proximate an outer annular ring surface that accommodates a first end connection of the sensing line, the sensing line in fluid communication with the pilot valve. In other embodiments, the first bore and the second bore can be radially offset from one another.

In another aspect, a method for regulating a system pressure of a pressurized fluid system is provided and includes the receiving, at a pilot valve, a first inlet pressure of a fluid at an inlet of a main valve. The first inlet pressure can be received from a sensing line coupling the pilot valve to a nozzle disposed in the inlet. The fluid can flow through a sensing tube disposed in a first bore in a flange of the nozzle and a second bore in an annular ring of the nozzle, the first bore and the second bore communicating with one another via an annular groove formed in the flange. When the first inlet pressure exceeds a predetermined threshold pressure, the pilot valve can open. The main valve can reduce the first inlet pressure to a second inlet pressure that is lower than the predetermined threshold pressure in response to the opening of the pilot valve. In some embodiments, the first bore and the second bore can be axially misaligned relative to one another such that the fluid is communicated through the annular groove. In other embodiments, the annular ring can be seated in an annular notch formed in the flange of the nozzle. In yet other embodiments, the second bore can receive a sensing tube coupled to the sensing line.

DESCRIPTION OF DRAWINGS

These and other features will be more readily understood from the following detailed description taken in conjunction with the accompanying drawings, in which.

Figure 1:
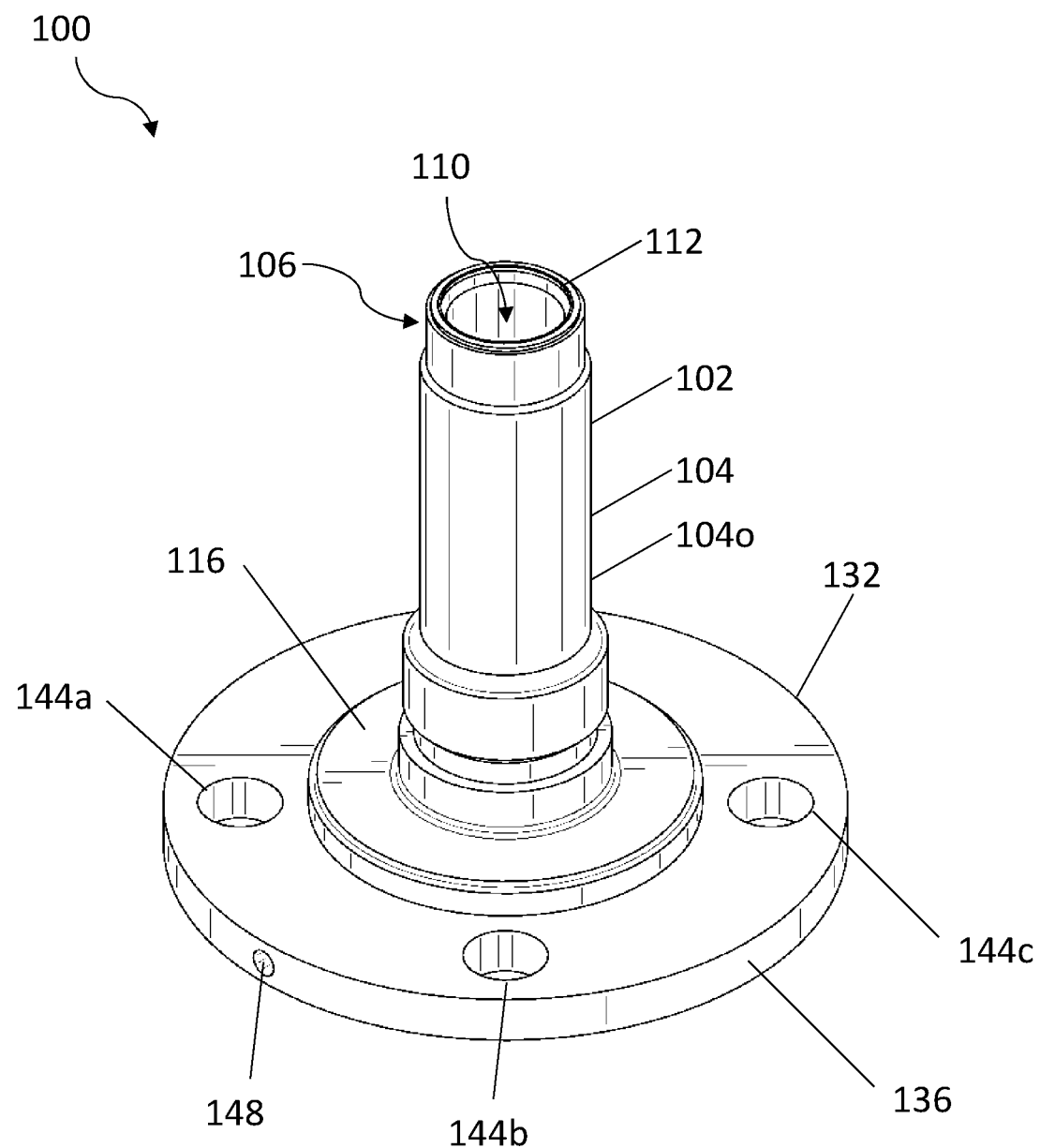
FIG. 1 is a perspective view of one exemplary embodiment of a pilot-operated pressure relief valve nozzle.
Figure 2:
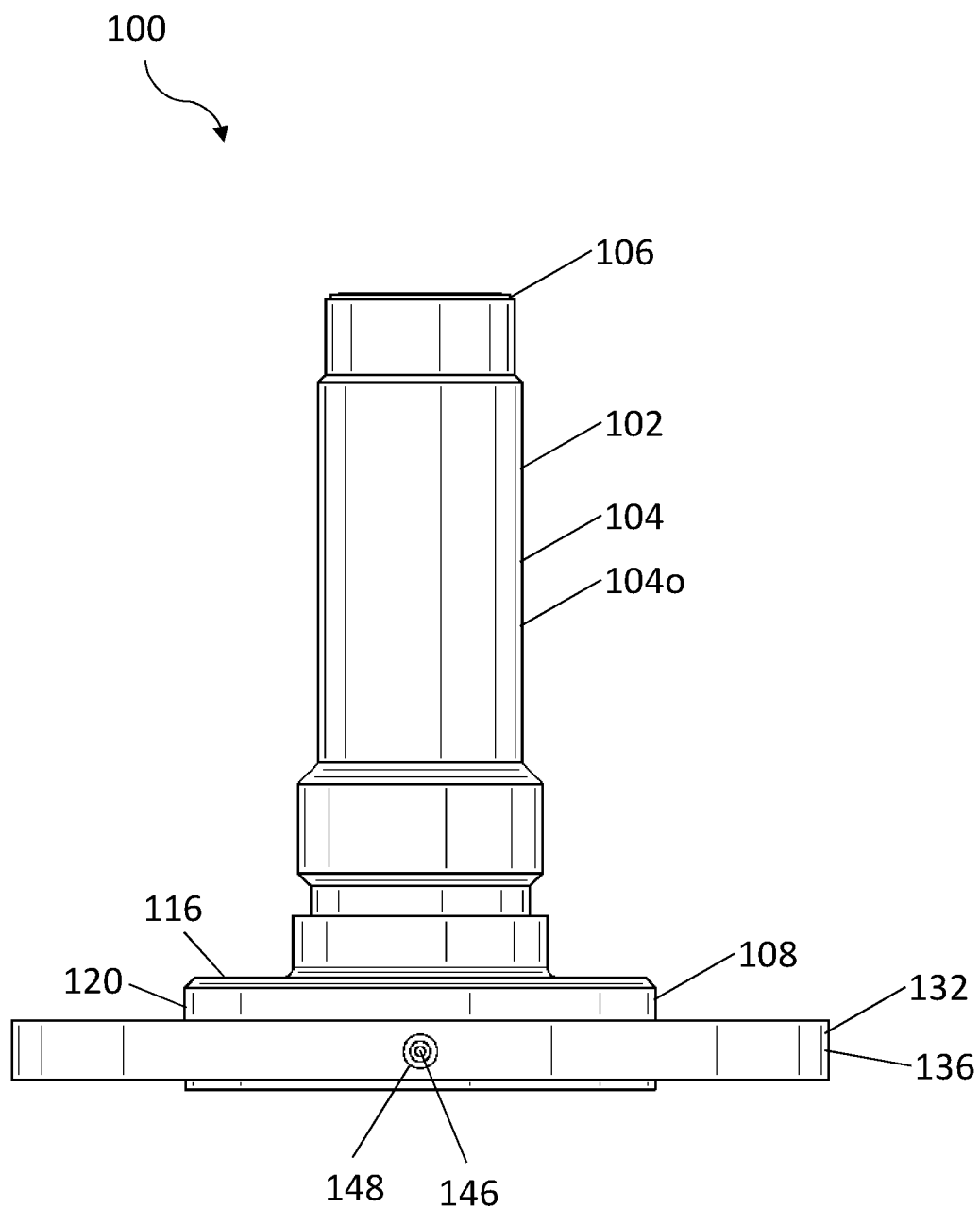
FIG. 2 is a side view of the pilot-operated pressure relief valve nozzle of FIG. 1.
Figure 3:
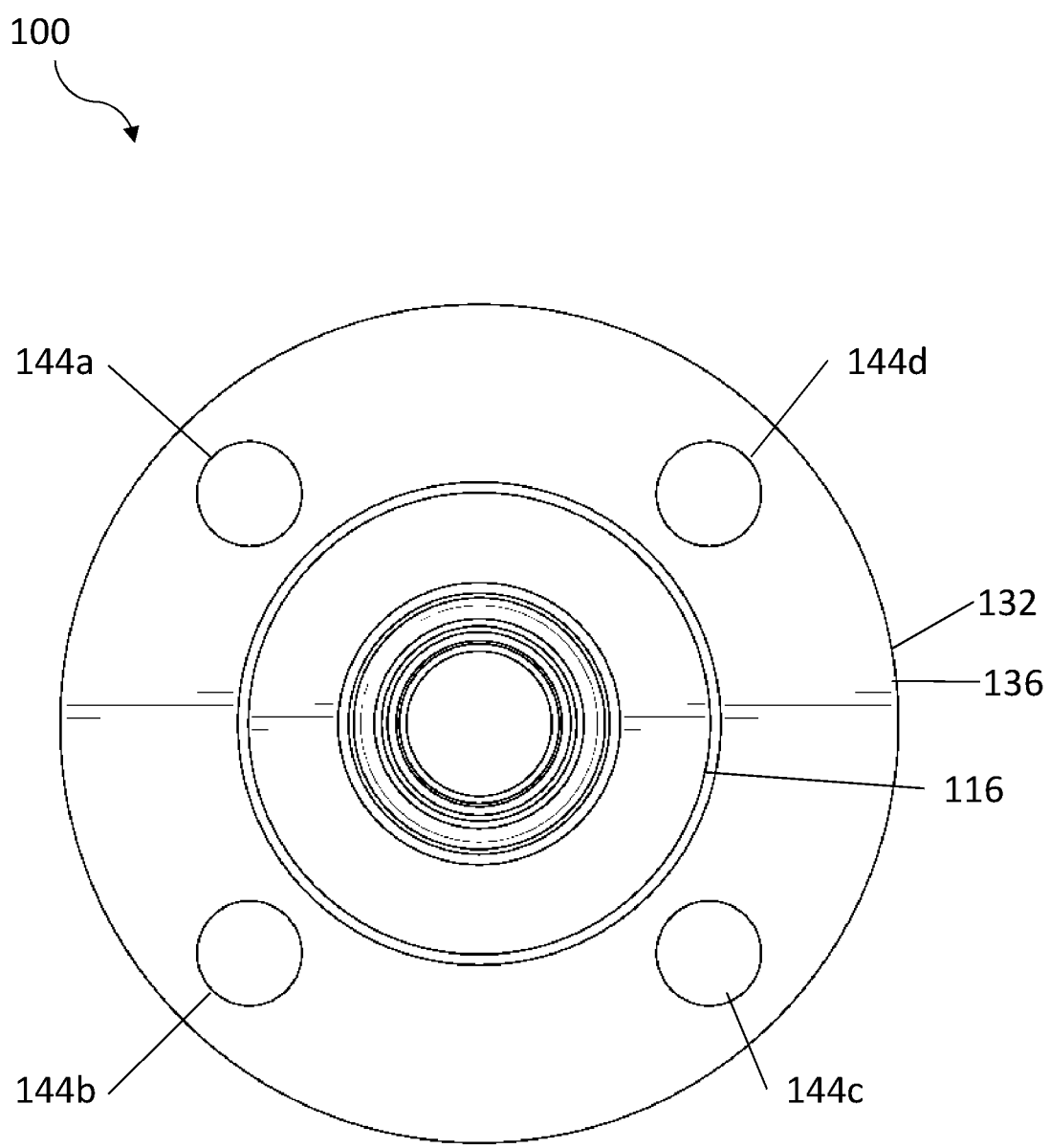
FIG. 3 is a top view of the pilot-operated pressure relief valve nozzle of FIG. 1.
Figure 4:
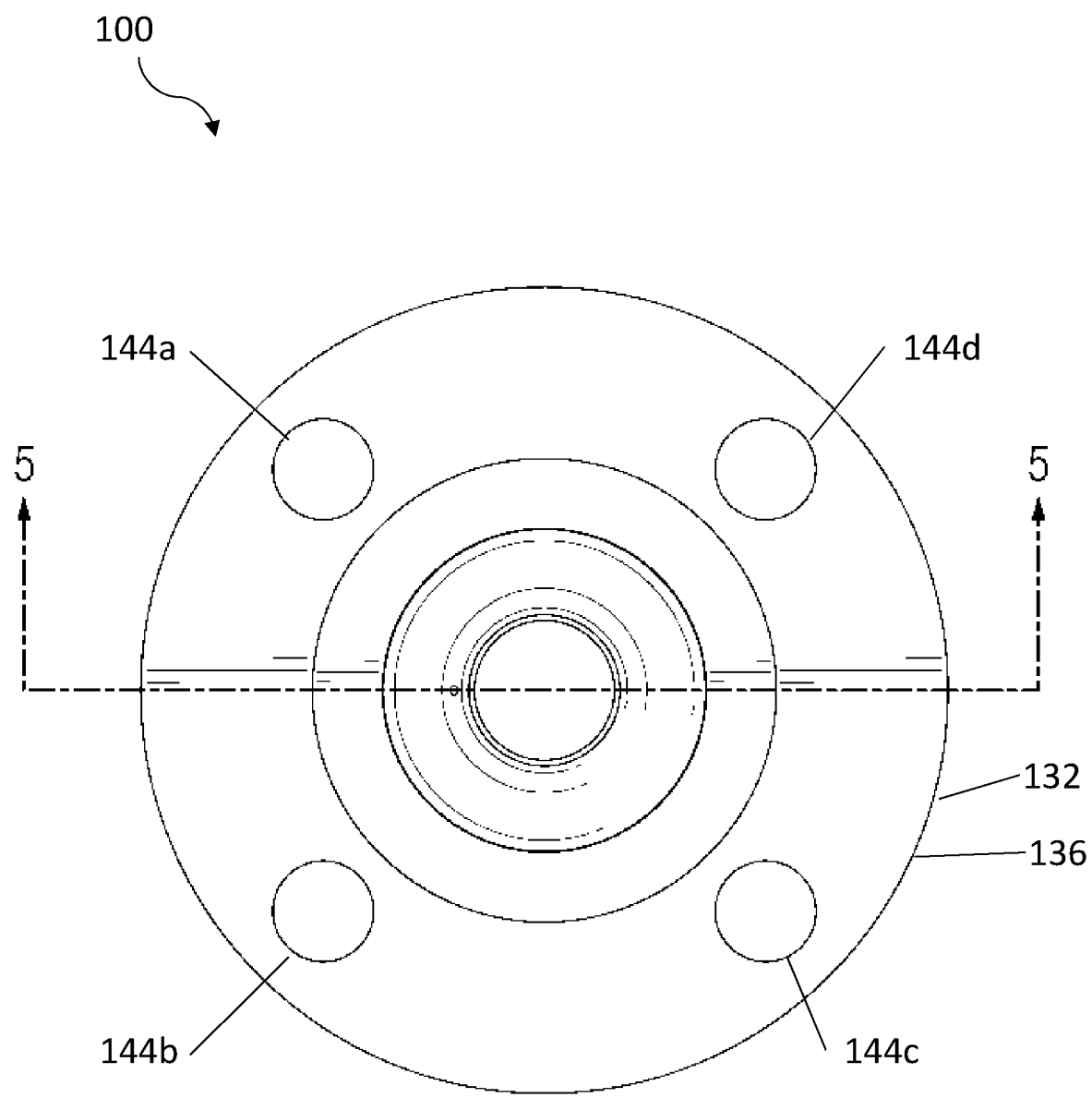
FIG. 4 is a bottom view of the pilot-operated pressure relief valve nozzle of FIG. 1.

It is noted that the drawings are not necessarily to scale. The drawings are intended to depict only typical aspects of the subject matter disclosed herein, and therefore should not be considered as limiting the scope of the disclosure.

DETAILED DESCRIPTION

A pilot-operated pressure relief valve nozzle and associated systems and methods are provided. In general, the nozzle can include a body having an elongate shaft with an inner lumen extending therethrough and a flange at one end thereof. The flange can have an annular notch configured to seat an annular ring. The annular notch has an annular groove formed therein that allows a first bore extending from the inner lumen of the body to the annular notch to communicate with a second bore extending through the annual ring and configured to couple to a fluid sensing line connected to a pilot valve. The groove eliminates the need for the first bore and the second bore to be in coaxial alignment with one another, thereby allowing for improved flexibility in placement of the fluid sensing line and pilot valve relative to the main valve.

The systems, devices, and methods herein produce a number of additional advantages and/or technical effects. For example, such an advantage can include the refitting of a direct spring-operated pressure relief valve systems to a pilot-operated pressure relief valve system without incurring the need to substantially replumb or retool the pressurized fluid system in the vicinity of the pressure relief valve system. The pilot-operated pressure relief valve nozzle described herein can permit a variety of mounting or coupling configurations so that pressure relief valve operators have improved design flexibility when considering pressure relief valve assembly replacements or the addition of a pilot-operated pressure relief valve in place of an existing direct spring-operated pressure relief valve as desired for their particular application or usage requirement.

Embodiments of pilot operated pressure relief valve nozzles and corresponding systems and methods of use in an oil and gas production environment are discussed herein. However, embodiments of the disclosure can be employed in other types of environments without limit.

FIGS. 1-6 show several views of one exemplary embodiment of a pilot operated pressure relief valve nozzle assembly 100 including a nozzle body 102 and an annular ring 132. As shown in FIGS. 1-6, the nozzle body 102 includes an elongate shaft 104 with a length that extends from a first end 106 of the nozzle body 102, along a longitudinal axis A, to a second end 108 of the nozzle body 102. The elongate shaft 104 can have an inner lumen 110 extending therethrough that is configured to permit passage of a fluid therein and into a main chamber of a main valve of a pilot-operated pressure relief valve (not shown). In some embodiments, the fluid can be a liquid, a gas, and/or a steam, but other types of fluids are possible.

The inner lumen 110 can have a diameter that can vary throughout the length of the elongate shaft 104 or that can remain substantially constant throughout the length of the elongate shaft 104. The inner lumen 110 can extend between a first opening 112 disposed at the first end 106 of the nozzle body 102, and a second opening 114 disposed at the second end 108 of the nozzle body 102.

The elongate shaft 104 can be configured to be inserted into an inlet of a main valve of a pilot-operated pressure relief valve. The elongate shaft 104 can have an outer surface 104o having mating features, such as threads (not shown) disposed thereon, that are configured to interface with corresponding mating features, such as threads, on an inner surface of the inlet of the main valve when the elongate shaft is inserted into the main valve, thereby securing the nozzle assembly 100 in the main valve. However, various mating techniques capable of interfacing with the inlet of the main valve for securing the nozzle in the inlet of the main valve can be used.

Figure 5:
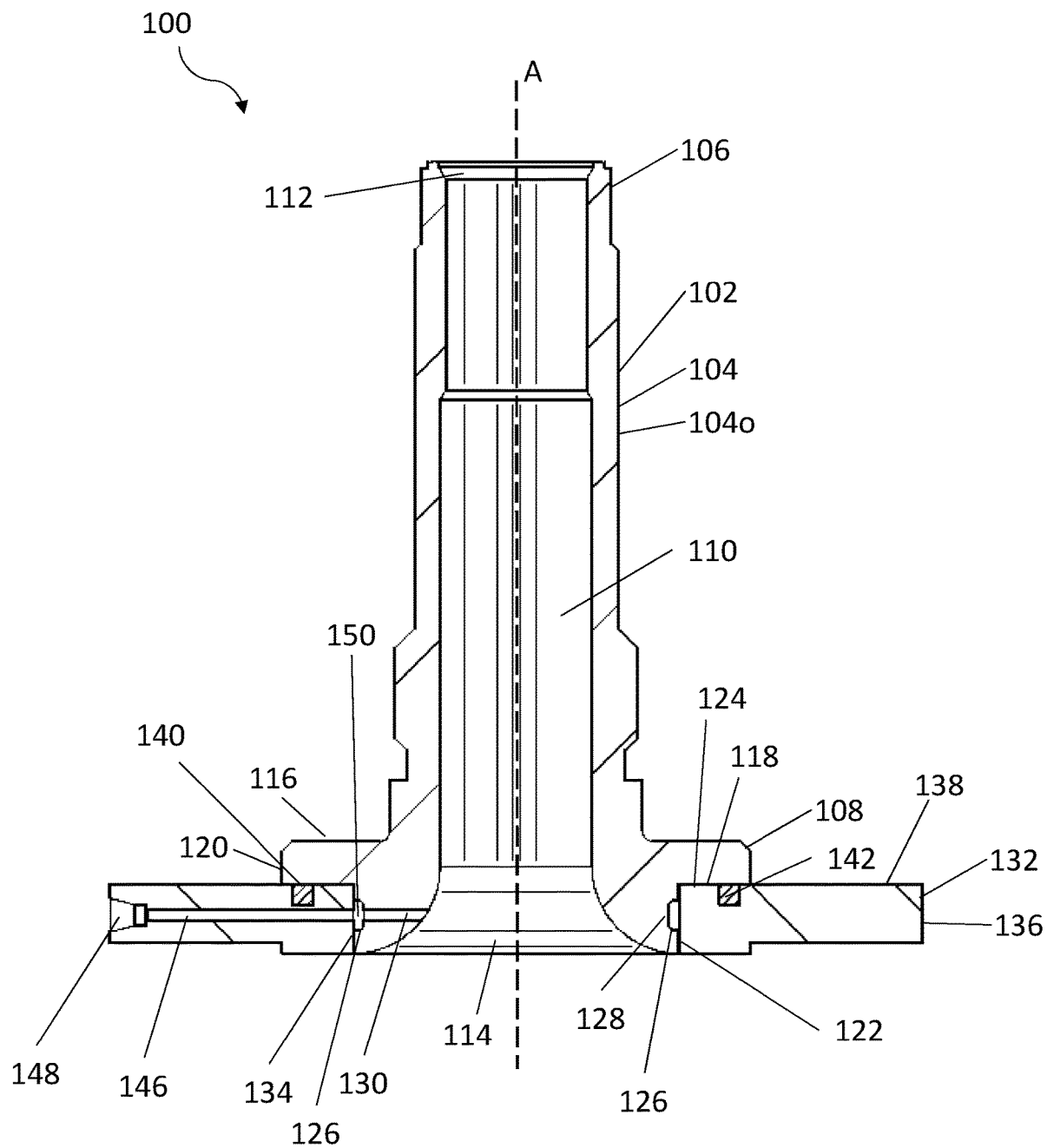
FIG. 5 is a cross-sectional view of the pilot-operated pressure relief valve nozzle of FIG. 1, taken about line 5-5 as shown in FIG. 4.
Figure 6:
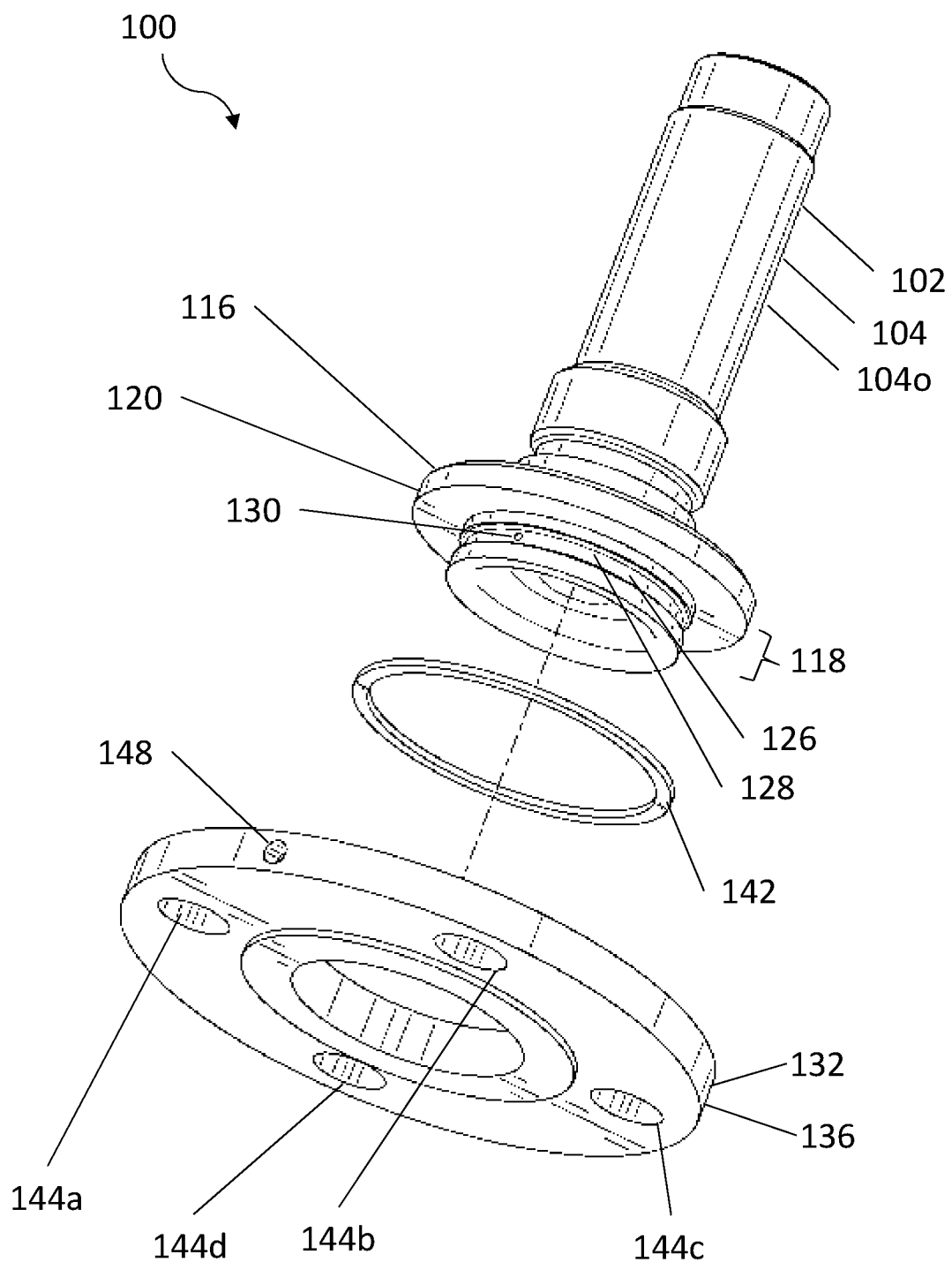
FIG. 6 is a perspective exploded view of the pilot-operated pressure relief valve nozzle of FIG. 1.

As further shown in FIGS. 1-6, the nozzle body 102 has a flange 116 that is located at the second end 108 of the nozzle body 102. In some embodiments, the flange 116 can be monolithically formed with the nozzle body 102. In other embodiments, the flange 116 can be disposed on or coupled to the nozzle body 102. As shown in FIG. 5, the flange has an annular notch 118 that is formed in a radially outermost surface 120 of the flange 116 and proximate the second end 108 of the nozzle body 102. The outermost surface 120 may be cylindrical as shown in FIGS. 1-6, however, in some embodiments, the outermost surface 120 may have flats formed therein for assembly. In other embodiments, the outermost surface 120 may be hexagonally shaped, or have other shapes that will facilitate easy assembly. The outermost surface 120 may also feature holes formed normal to it to facilitate assembly with a wrench, such as a spanner wrench. As shown, the annular notch 118 has a first surface 122 and a second surface 124 that is oriented orthogonal to the first surface 122. The first surface 122 and the second surface 124 are configured to interface with an annular ring 132 of the nozzle assembly 100, which is discussed in further detail below. The first surface 122 and the second surface 124 can be oriented at various angles relative to one another depending on the configuration of the annular ring 132. For example, the surfaces 122, 124 can be at 90 degrees relative to one another, less than 90 degrees relative to one another, or greater than 90 degrees relative to one another. The annular notch 118 can have various other configurations and can have any shape that enables the annular notch 118 to seat the annular ring 132. In some embodiments, the first surface 122 can extend parallel to the longitudinal axis A.

As further shown in FIGS. 1-6, the annular notch 118 can include an annular channel or groove 126 formed in the first surface 122 and extending circumferentially therearound. The groove 126 can include an inner surface 128 disposed radially inward of the first surface 122. The annular notch 118 can also include a first bore 130 that can extend radially outward from the inner lumen 110, through the nozzle body 102, to the inner surface 128 of the groove 126.

As referenced above, and as shown in FIGS. 1-6, the nozzle assembly 100 can include an annular ring 132 that is at least partially seated in the annular notch 118. As shown in FIG. 5, the annular ring 132 has an inner annular ring surface 134 that is in contact with the first surface 122 of the flange 116. The annular ring 132 has an outer annular ring surface 136 that is oriented radially outward from the inner annular ring surface 134. The annular ring 132 can also include a front surface 138 having a gasket groove 140 configured to receive a gasket 142 for providing an airtight seal between the flange 116 and the annular ring 132. In some embodiments, as shown in FIGS. 1-4 and 6, the annular ring 132 can include a plurality of annular ring fastening bores 144a-d that are each configured to receive hardware (e.g., fasteners, not shown) for securing and orienting the annular ring 132 in place and to the inlet of the main valve. In some implementations, the fixation to the inlet that is provided by the hardware and the annular ring fastening bores 144a-d can provide sufficient pressure on the gasket 142 so as to maintain the airtight seal between the flange 116 and the annular ring 132. As shown, the annular ring includes four annular ring fastening bores, however, the quantity and position of the fastening bores may be modified such that they can align with corresponding bores on the inlet of the main valve.

As shown in FIGS. 1-6, a second bore 146 can be formed in the annular ring 132 and can extend radially between the inner annular ring surface 134 and the outer annular ring surface 136. The second bore 146 can be configured to couple to a first end connection of a fluid sensing line (such as fluid sensing line 210 shown in FIGS. 12A and 13, as described further below) that is in fluid communication with a pilot valve of the pilot-operated pressure relief valve (such as pilot valve 204 shown in FIG. 12A, as described further below) that is disposed at a second end connection of the fluid sensing line. The second bore 146 can have a port 148 proximate the outer annular ring surface 136. In some embodiments, the port 148 that is configured to accommodate a portion of the first end connection of the fluid sensing line. In such an embodiment, the port 148 may have a larger diameter than the second bore 146.

As shown in FIG. 5, the groove 126 of the first surface 122 of the annular notch 118 can also define a fluid pathway 150 that is encapsulated by the groove 126 and the inner annular ring surface 134. As the fluid pathway 150 is in fluid communication with each of the first and second bores 130, 146, fluid communication between the first end connection of the fluid sensing line and the inner lumen 110 can be maintained, which can enable the determination, by a pilot valve, of a pressure level of the pressurized system as measured at the lumen 110.

Figure 7:
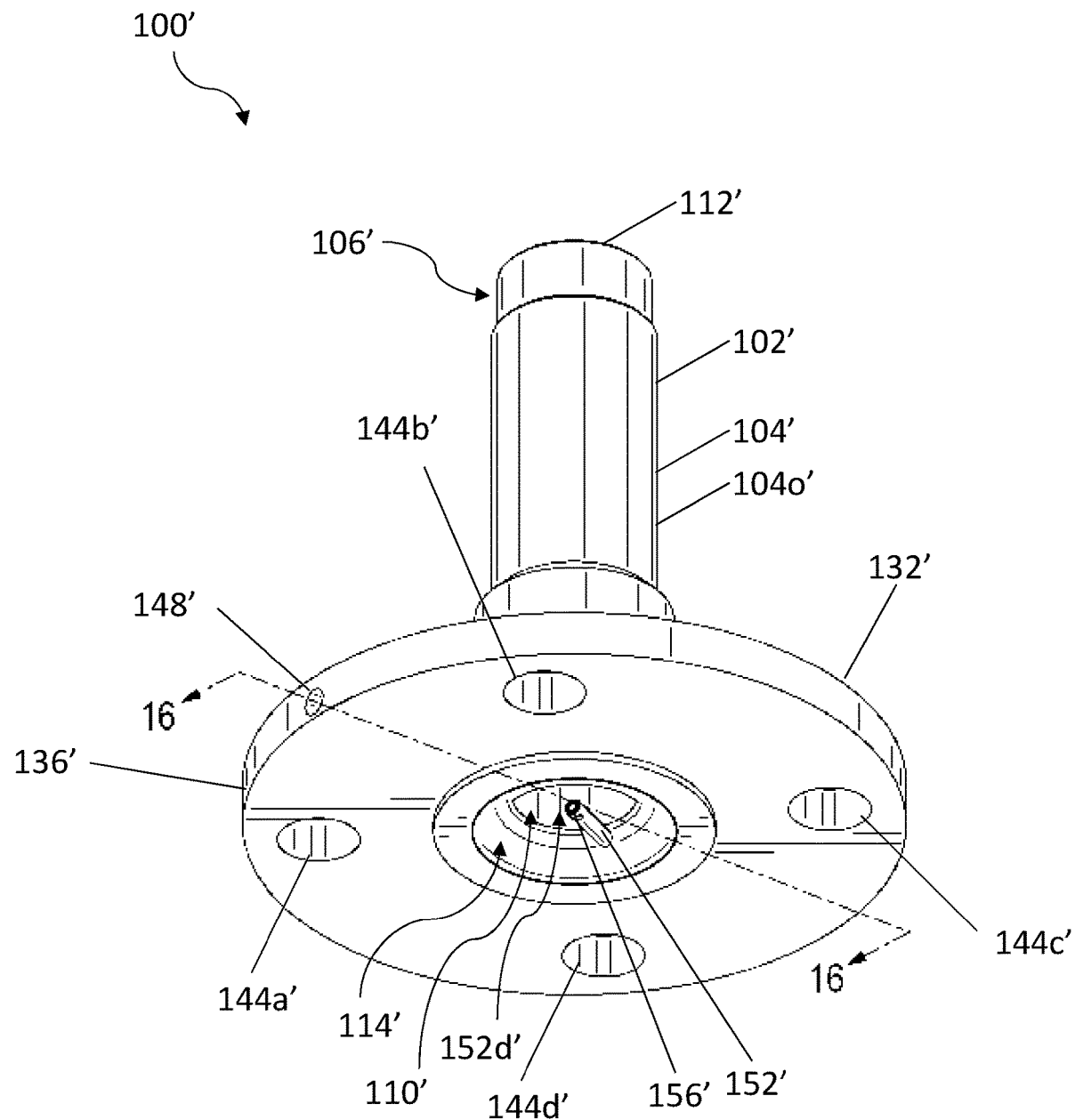
FIG. 7 is a perspective view of an additional exemplary embodiment of a pilot-operated pressure relief valve nozzle.
Figure 8:
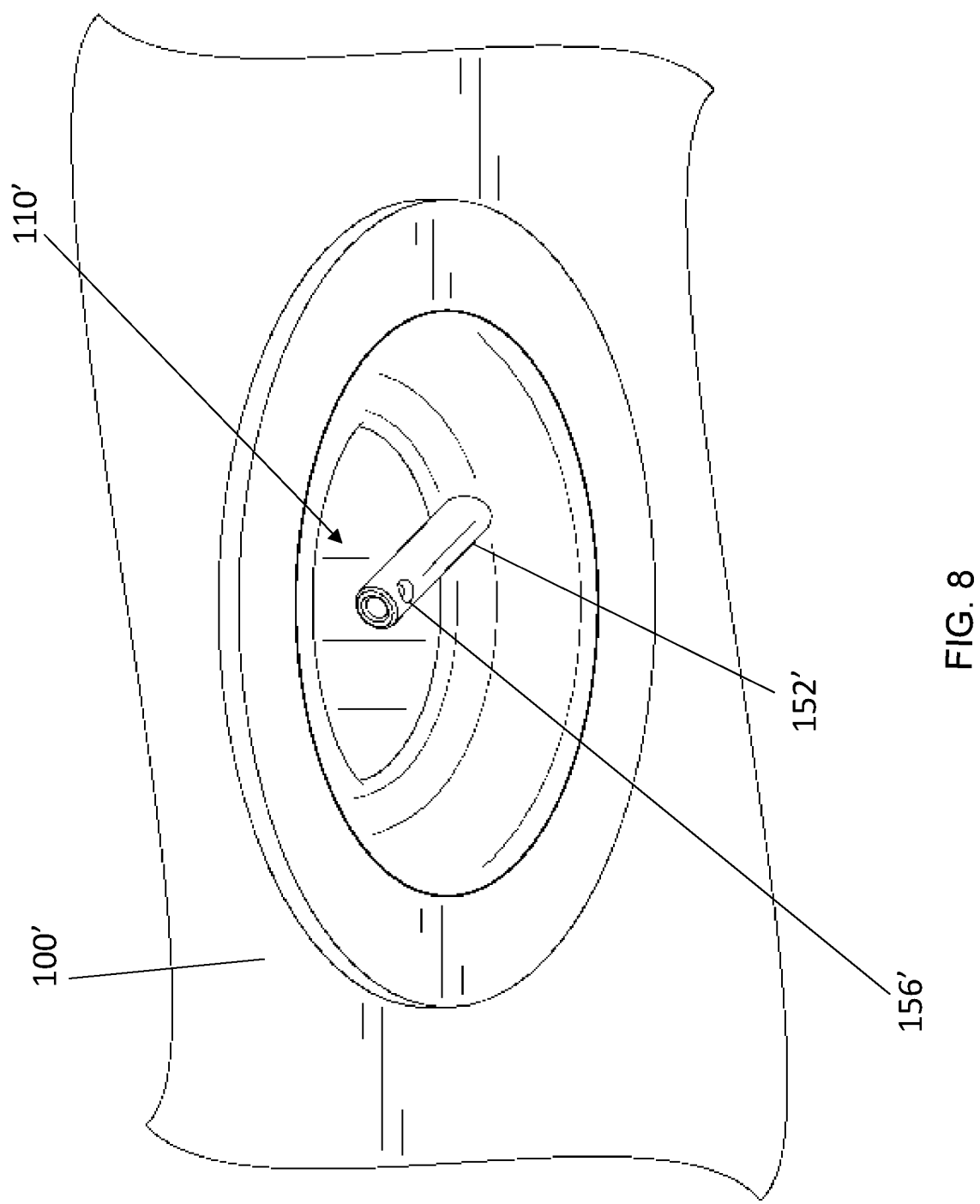
FIG. 8 is a magnified perspective view of the inlet of the pilot-operated pressure relief valve nozzle of FIG. 7.
Figure 9:
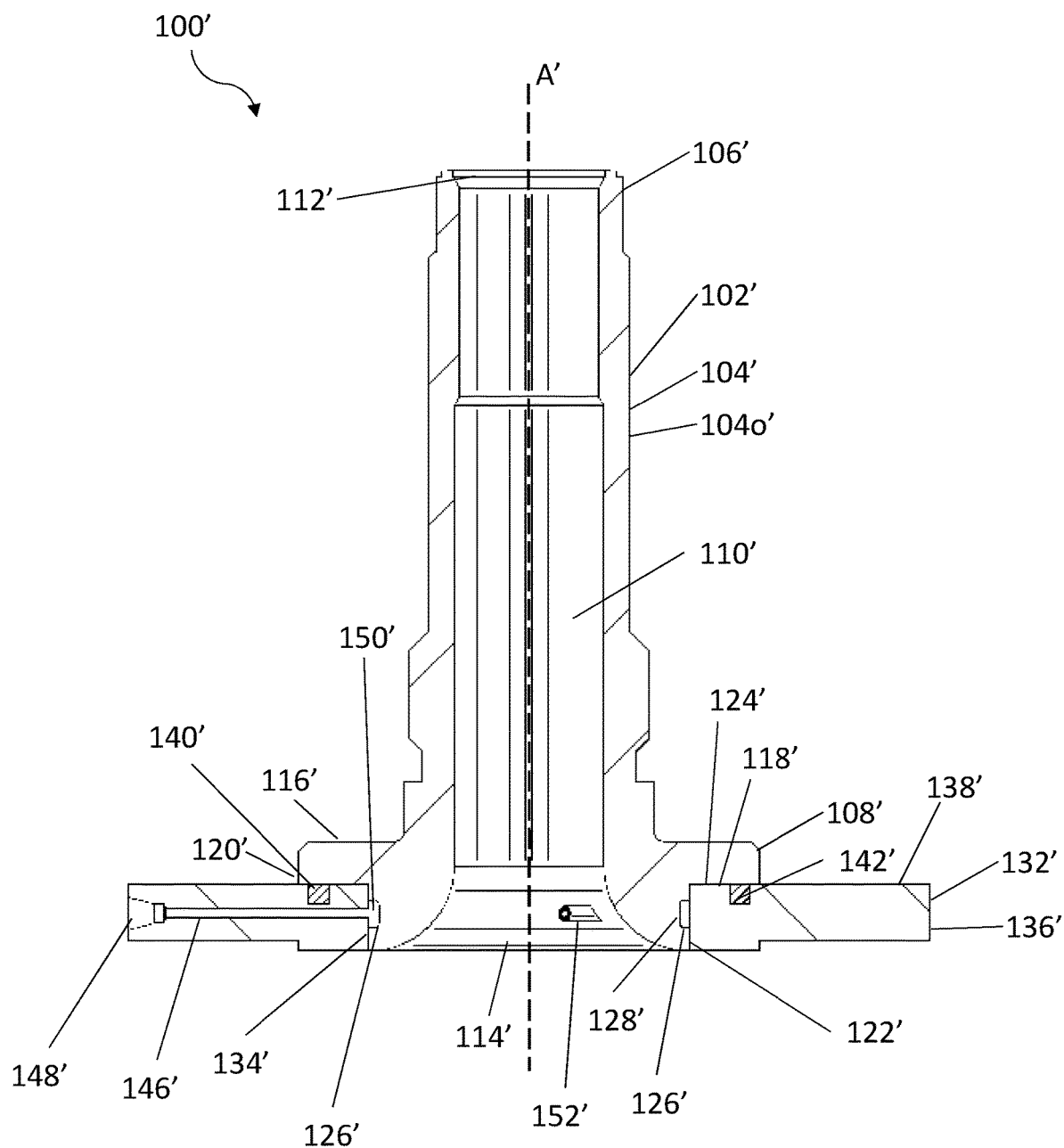
FIG. 9 is a cross-sectional view of the pilot-operated pressure relief valve nozzle of FIG. 7, taken about line 16-16 as shown in FIG. 7.
Figure 10:
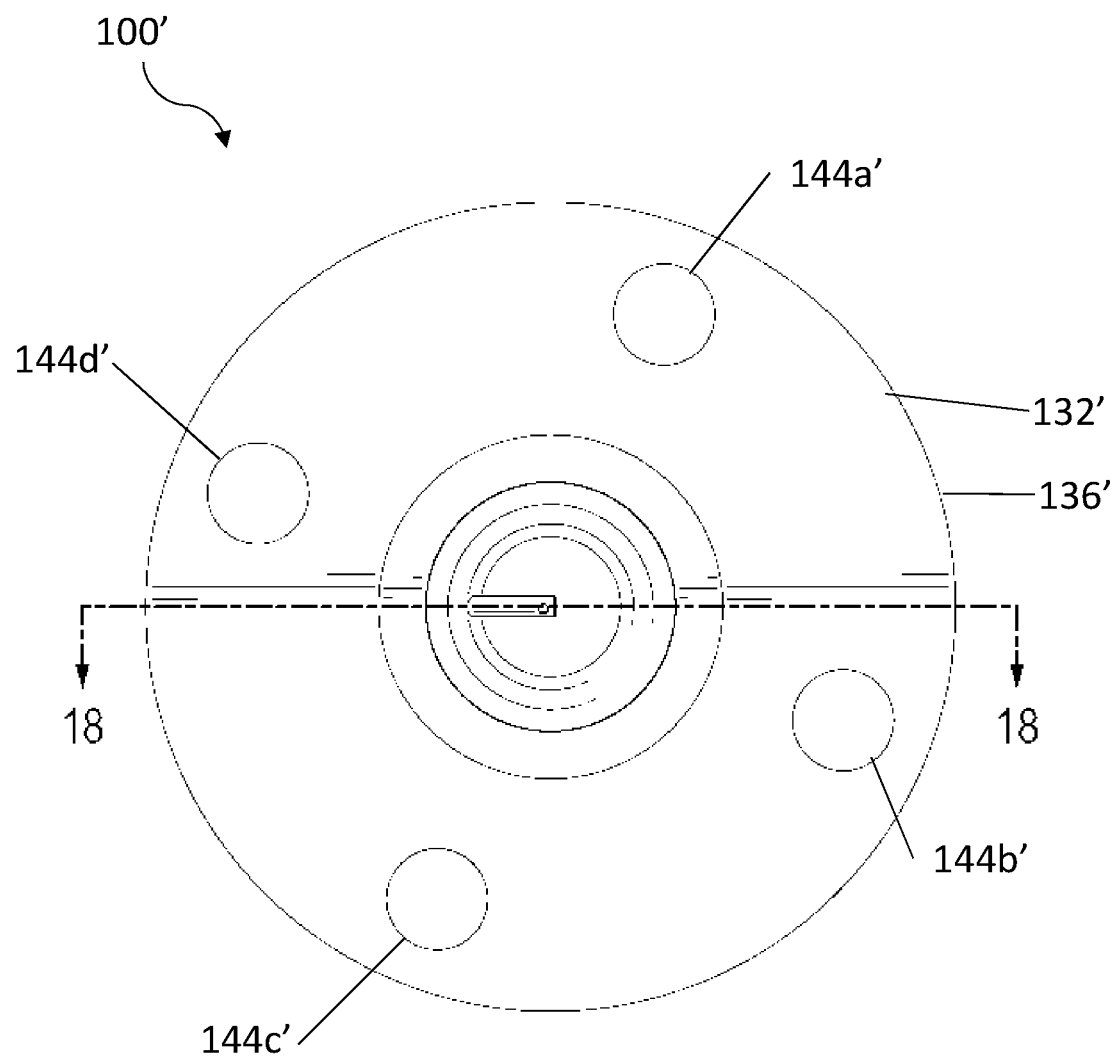
FIG. 10 is a bottom view of the pilot-operated pressure relief valve nozzle of FIG. 7.
Figure 11:
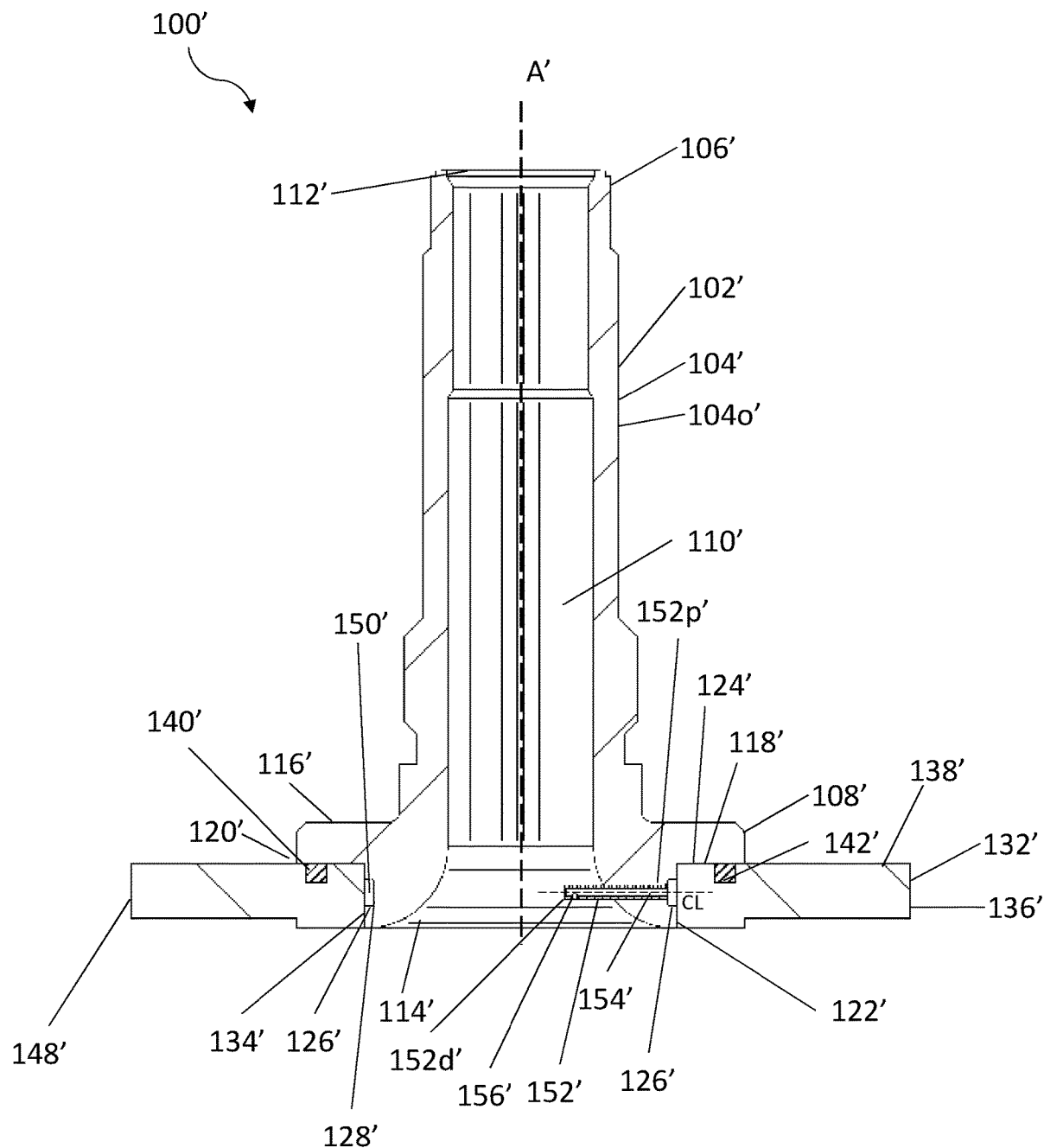
FIG. 11 is a cross-sectional view of the pilot-operated pressure relief valve nozzle of FIG. 7, taken about line 18-18 as shown in FIG. 10.

As shown in FIGS. 1-6, the second bore 146 is axially aligned with the first bore 130. However, in some embodiments, such as the nozzle 100' shown in FIGS. 7-11, the annular ring can be rotationally adjusted relative to the nozzle body such that the first and second bores can be axially offset but still configured to maintain fluid communication between the center of the inner lumen of the nozzle body and the first end connection of a fluid sensing line, thereby allowing for increased flexibility in positioning the fluid sensing line relative to the nozzle. As shown in FIGS. 7-9, the nozzle 100' is the same as the nozzle 100 of FIGS. 1-6, and has the same components, thus like reference numbers are used to indicate corresponding parts. In the illustrated embodiment, the nozzle 100' also additionally includes a nozzle sensing tube 152' that has a distal end 152d' extending into an inner lumen 110' of a nozzle body 102' of the nozzle 100', and a proximal end 152p' disposed in the first bore 130'. As shown, the nozzle sensing tube 152' is cylindrically shaped, however, the nozzle sensing tube 152' may have a variety of shapes and/or geometries.

The nozzle sensing tube 152' can also include a lumen 154' that extends from the proximal end 152p', along a centerline axis CL of the nozzle sensing tube 152', to a region just proximal of the distal end 152*d'*. As such, the distal end 152*d'* of the nozzle sensing tube 152' is closed, and the proximal end 152*p'* of the nozzle sensing tube 152' is open. However, in some embodiments, the lumen 154' can extend to the distal end 152*d'* such that the distal end 152*d'* is open.

The nozzle sensing tube 152' can include a nozzle sense hole 156' proximate the distal end 152*d'* that is formed in a sidewall of the nozzle sensing tube 152' and oriented perpendicular to the centerline axis CL of the nozzle sensing tube 152' and parallel to the longitudinal axis A' of the nozzle body 102'. As such, the nozzle sense hole 156' can be oriented toward the pressurized system, facing the second opening 114', to facilitate determination of a pressure level of the pressurized system as measured at the lumen 110. In some embodiments, the nozzle sensing tube 152' may extend to the center of the inner lumen 110' such that the pressure level of the pressurized system at the center of the inner lumen 110' can be detected, to thereby avoid any inaccurate determinations due to any boundary layer effects that may be present in the fluid flow of the pressurized system.

Similar to the groove 126 of FIGS. 1-6, the groove 126' of the first surface 122' of the annular notch 118' can partially define a fluid pathway 150' that is encapsulated by the groove 126' and the inner annular ring surface 134'. The nozzle sense hole 156' permits fluid communication to be established between the lumen 154' and the pressurized system. As the proximal end 152*p'* is open, fluid communication is established between the lumen 154' and the fluid pathway 150', which is in fluid communication with the second bore 146'. As such, fluid communication between a first end connection of a fluid sensing line and the inner lumen 110' can be maintained. As such, the fluid pathway 150', formed by the groove 126' and the inner annular ring surface 134', permits a pilot valve coupled to the opposite end of the fluid sensing line, to sense the pressure of the fluid entering the inlet of the main valve via the nozzle body 102' as measured in the inner lumen 110'.

Figure 12A:
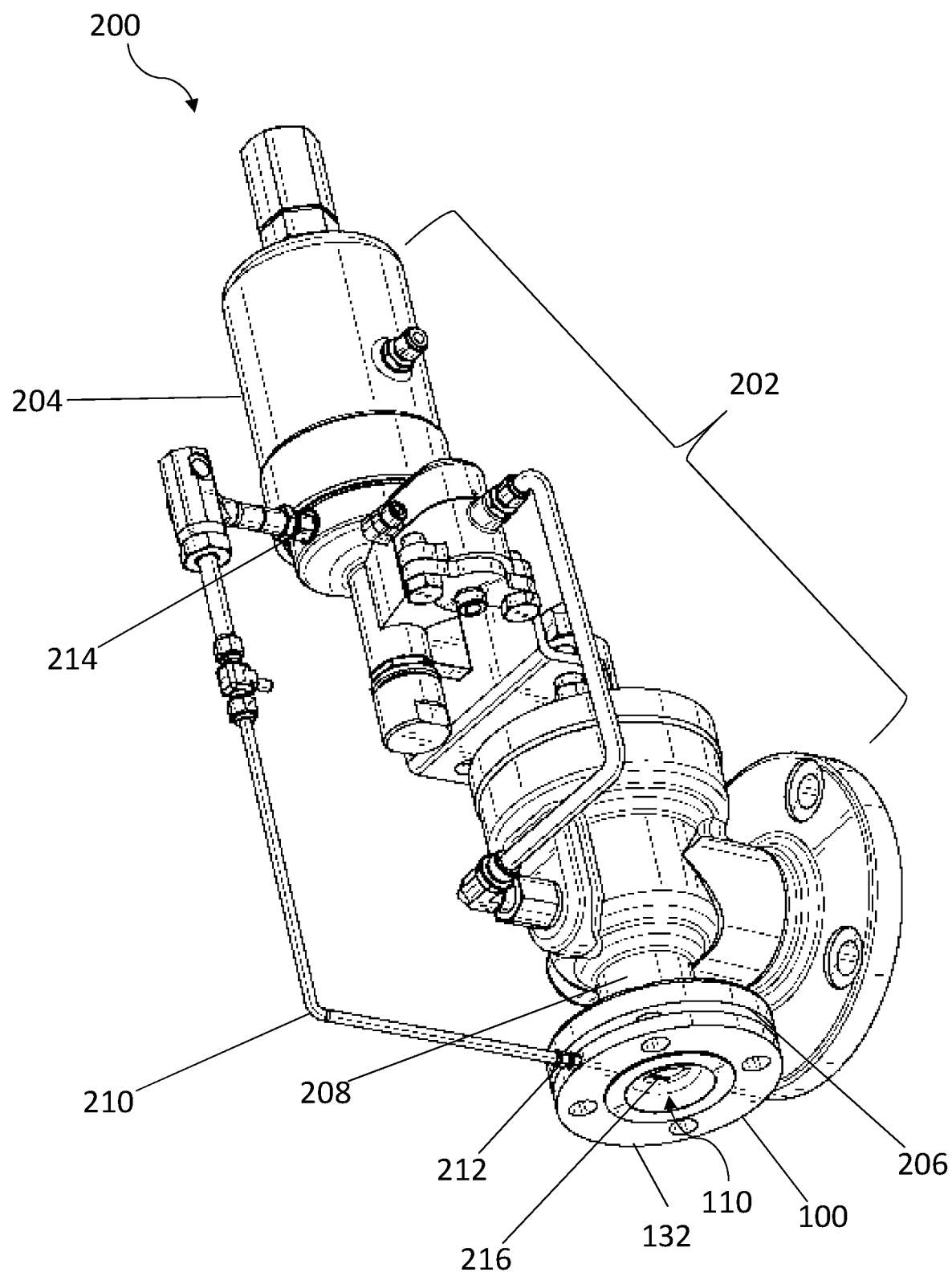
FIG. 12A is a perspective view of one exemplary embodiment of a system including a pilot-operated pressure relief valve, the pilot-operated pressure relief valve nozzle of FIG. 1, and a sensing line inserted into the pilot-operated pressure relief valve nozzle.
Figure 12B:
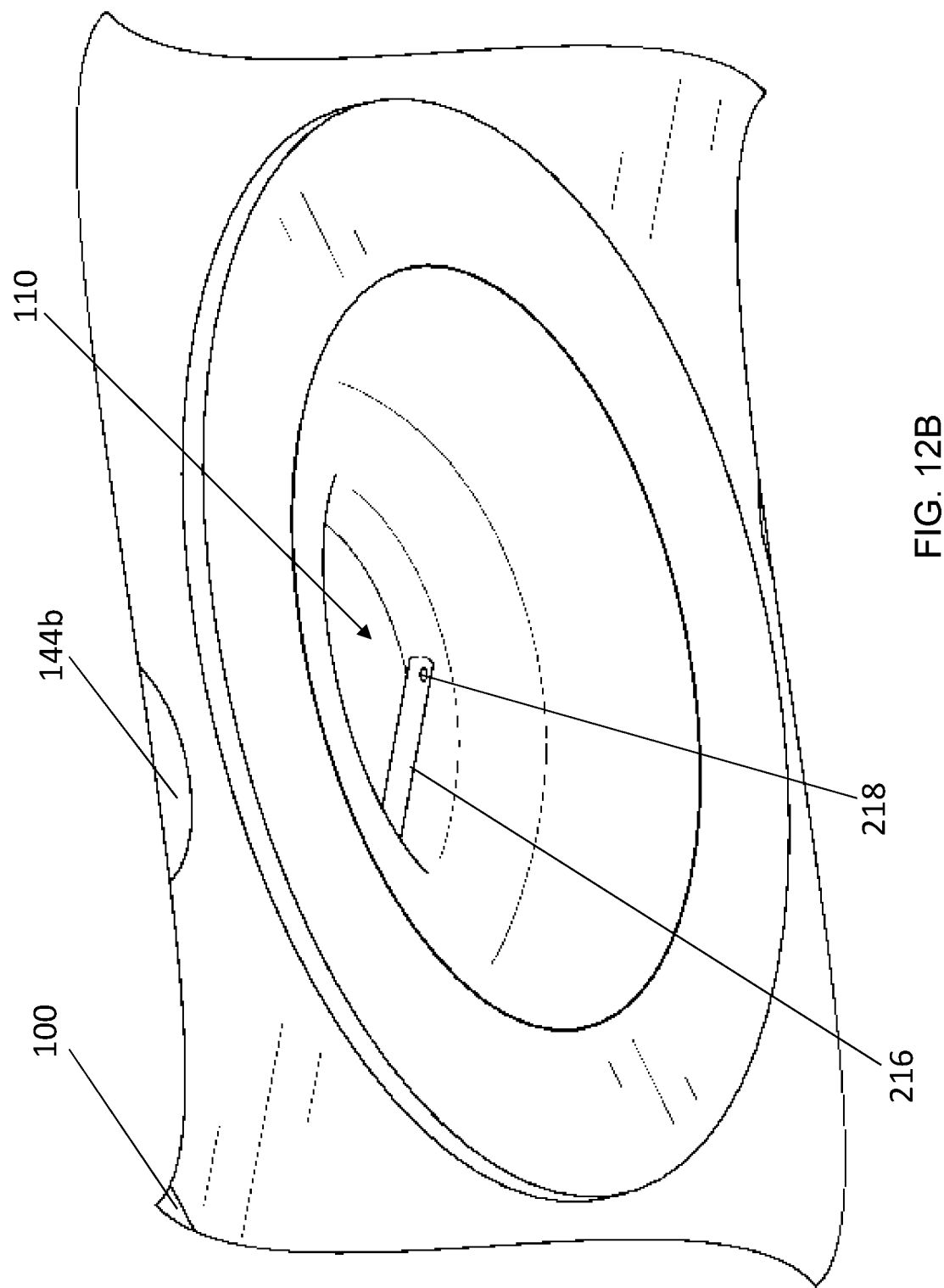
FIG. 12B is a magnified perspective view of the inlet of the pilot-operated pressure relief valve nozzle of FIG. 1, as shown in the system of FIG. 12A.
Figure 13:
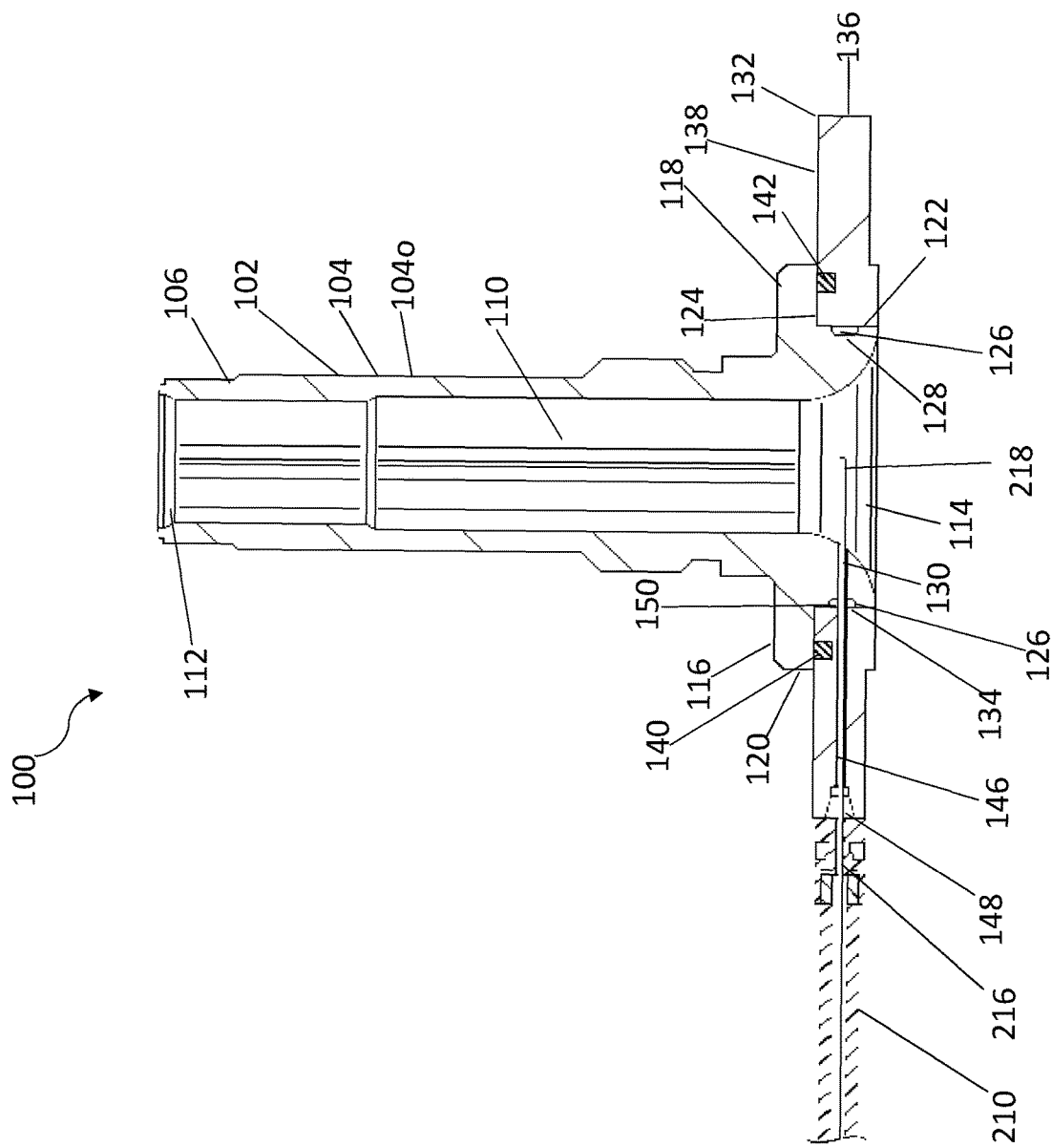
FIG. 13 is a cross-sectional view showing the sensing line inserted into the pilot-operated pressure relief valve nozzle of FIG. 1, as shown in the system of FIG. 12A.

As indicated above, the nozzle assembly 100, consisting of the nozzle body 102 and the annular ring 132, can be provided as part of a system that further includes a pilot-operated pressure relief valve. FIGS. 12A-13 show one exemplary embodiment of a system 200 that incorporates the nozzle assembly 100. As shown, the system 200 includes a pilot-operated pressure relief valve 202 having the pilot valve 204 and a main valve 206 in fluid communication with the pilot valve 204. In addition, as shown in FIGS. 12A and 13, the system 200 includes a fluid sensing line 210 that features a first end connection 212 that is coupled to the port of nozzle assembly 100, and a second end connection 214 that is coupled to the pilot valve 204. The fluid sensing line 210 can be assembled to the first bore 130 with threads or by compression fitting or other methods. As shown in FIG. 13, the fluid sensing line 210 can have a sensing tube 216 disposed therein with a distal end that extends through the second bore 146 and into the inner lumen 110 of the nozzle body 102. The sensing tube 216 can have a sense hole 218, as shown in FIG. 12B, that is disposed perpendicular to the centerline axis of the sensing tube proximate its distal end. The sense hole 218 can be oriented parallel to the longitudinal axis of the body and in the direction of the pressurized system, facing the second opening 114. In some embodiments, the sensing tube 216 may extend to the center of the inner lumen 110, such that the sense hole 218 is positioned proximate the center of the inner lumen 110. As a result of this configuration and the configuration of nozzle assembly 100 discussed above, the pilot valve 204 is in fluid communication with the inner lumen 110 of the nozzle assembly 100, and the pilot valve 204 can sense a pressure level of the pressurized fluid system.

To assemble the system 200, the elongate shaft 104 of the nozzle body 102 can be inserted into the inlet 208 of the main valve 206 of the pilot-operated pressure relief valve 202. The elongate shaft 104 can be fixed in the inlet 208 in the manner described above. The annular ring 132 can be fixed on the nozzle body 102 in the desired orientation, independent of the insertion of the elongate shaft 104 into the inlet. The first end connection 212 of the fluid sensing line 210 can be inserted into the port of the annular ring 132 of the nozzle assembly 100, and the second end connection 214 of the fluid sensing line 210 can be coupled with the pilot valve 204 to establish the fluid communication between the inner lumen 110 of the nozzle assembly 100 and the pilot valve 204. The fluid sensing line 210 can also include a sensing probe disposed therein that can be received by the second bore 146. The sensing probe can be configured to measure a pressure of the fluid in the inner lumen 110 of the nozzle body 102 of the nozzle assembly 100.

Figure 14:
FIG. 14 is a flow diagram illustrating one exemplary embodiment of a method for regulating a system pressure of a pressurized fluid system.

FIG. 14 shows one exemplary embodiment of a method 1000 for regulating a system pressure of a pressurized fluid system. While the method 1000 is described in the context of the nozzle assembly 100 of FIGS. 1-6, and the system 200 of FIGS. 12A-13, the method 1000 is not limited to such components and can be performed to regulate other systems using a pilot-operated pressure relief valve as described herein.

In step 1010, a first inlet pressure of a fluid at the inlet 208 of the main valve 206 can be received at pilot valve 204 from fluid sensing line 210, which couples the pilot valve 204 to the nozzle assembly 100 disposed in the inlet 208. As the first bore and the second bore are in fluid communication with one another via the annular groove formed in the flange, the fluid can flow through the first bore of the flange of the nozzle, and the second bore of the annular ring of the nozzle. When the first inlet pressure exceeds a predetermined threshold pressure, the pilot valve opens. The main valve, in response to the opening of the pilot valve, opens to relieve system pressure until such time that the inlet pressure reaches a second inlet pressure that is lower than the predetermined threshold pressure. The pilot valve, still in communication with the system pressure, will close, thereby closing the main valve.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

What is claimed is:

1. A pilot-operated pressure relief valve nozzle assembly comprising:
   a body having an elongate shaft extending along a longitudinal axis from a first end of the body to a second end of the body, the elongate shaft having an inner lumen extending therethrough and a flange at the second end, the flange having an annular notch formed therein with an annular groove formed in the annular notch, and the flange having a first bore extending therethrough from the inner lumen to the groove; and
   an annular ring seated in the annular notch, the annular ring having an inner annular ring surface, an outer annular ring surface radially outward from the inner annular ring surface, and a second bore extending through the annular ring between the inner annular ring surface and the outer annular ring surface, the second bore being in fluid communication with the first bore via the annular notch.

2. The pilot-operated pressure relief valve nozzle assembly of claim 1, wherein the annular notch has a first surface and a second surface oriented orthogonal to the first surface.

3. The pilot-operated pressure relief valve nozzle assembly of claim 2, wherein the first surface extends parallel to the longitudinal axis and the groove is formed in the first surface.

4. The pilot-operated pressure relief valve nozzle assembly of claim 1, wherein the first bore is configured to receive a sensing tube having a sense hole oriented perpendicular to a centerline axis of the sensing tube and oriented parallel to the longitudinal axis of the elongate shaft, the sense hole facing the second opening.

5. The pilot-operated pressure relief valve nozzle assembly of claim 4, wherein the sensing tube extends into the inner lumen such that an inlet pressure is sensed.

6. The pilot-operated pressure relief valve nozzle assembly of claim 1, wherein the groove defines a fluid pathway between the groove and the inner annular ring surface.

7. The pilot-operated pressure relief valve nozzle assembly of claim 1, wherein the second bore is radially off-set from the first bore.

8. The pilot-operated pressure relief valve nozzle assembly of claim 1, wherein the inner lumen extends between a first opening formed at the first end and a second opening formed at the second end.

9. The pilot-operated pressure relief valve nozzle assembly of claim 1, wherein the second bore includes a port proximate the outer annular ring surface and configured to accommodate a first end connection of a pilot valve sensing line.

10. The pilot-operated pressure relief valve nozzle assembly of claim 1, wherein the annular ring can be independently oriented relative to the body.

11. A system, comprising:
    a pilot-operated pressure relief valve configured to regulate a system pressure of a pressurized fluid system, the pilot-operated pressure relief valve including a main valve having an inlet in fluid communication with the pressurized fluid system, a pilot valve in fluid communication with the main valve, and a sensing line configured to measure an inlet pressure of the pressurized fluid system; and
    a pilot-operated pressure relief valve nozzle having a body with an elongate shaft disposed in the inlet and a flange disposed proximate the inlet, the elongate shaft having an inner lumen extending therethrough and in fluid communication with the inlet of the main valve, the flange having an annular notch that seats an annular ring, and the flange having an annular groove formed in the annular notch such that a first bore extending through the flange from the inner lumen to the annular notch fluidly communicates with a second bore extending through the annular ring via the annular groove thus allowing fluid communication between the inner lumen and the sensing line.

12. The system of claim 11, wherein the groove is axially aligned with the first bore and the second bore.

13. The system of claim 11, wherein the first bore receives a sensing tube that extends into the inner lumen such that an inlet pressure is sensed.

14. The system of claim 11, wherein the second bore receives a sensing tube coupled to the sensing line.

15. The system of claim 11, wherein the second bore includes a port proximate an outer annular ring surface that accommodates a first end connection of the sensing line, the sensing line in fluid communication with the pilot valve.

16. The system of claim 11, wherein the first bore and the second bore are radially offset from one another.

17. A method for regulating a system pressure of a pressurized fluid system, comprising: receiving, at a pilot valve, a first inlet pressure of a fluid at an inlet of a main valve, the first inlet pressure received from a sensing line coupling the pilot valve to a nozzle assembly disposed in the inlet, the fluid flowing through a sensing tube disposed in a first bore in a flange of a nozzle included in the nozzle assembly and a second bore in an annular ring of the nozzle assembly, the first bore and the second bore communicating with one another via an annular groove formed in the flange, wherein, when the first inlet pressure exceeds a predetermined threshold pressure, the pilot valve opens, and wherein the main valve reduces the first inlet pressure to a second inlet pressure that is lower than the predetermined threshold pressure in response to the opening of the pilot valve.

18. The method of claim 17, wherein the first bore and the second bore are axially misaligned relative to one another such that the fluid is communicated through the annular groove.

19. The method of claim 17, wherein the annular ring is seated in an annular notch formed in the flange of the nozzle.

20. The method of claim 17, wherein the second bore receives a sensing tube coupled to the sensing line.

* * * * *